United States Patent
Danilov et al.

(10) Patent No.: US 9,912,727 B1
(45) Date of Patent: Mar. 6, 2018

(54) MULTIPLE CONCURRENT IN-FLIGHT REPLIES IN A DISTRIBUTED STATE SYSTEM

(71) Applicant: Seagate Technology LLC, Cupertino, CA (US)

(72) Inventors: Nikita Danilov, Moscow (RU); Nathaniel Rutman, Portland, OR (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 329 days.

(21) Appl. No.: 14/733,309

(22) Filed: Jun. 8, 2015

(51) Int. Cl.
| | |
|---|---|
| *G06F 15/16* | (2006.01) |
| *H04L 29/08* | (2006.01) |
| *H04L 29/06* | (2006.01) |
| *G06F 17/30* | (2006.01) |

(52) U.S. Cl.
CPC ........ *H04L 67/06* (2013.01); *G06F 17/30194* (2013.01); *H04L 67/42* (2013.01)

(58) Field of Classification Search
CPC ........... G06F 17/30194; G06F 11/1469; G06F 11/1461; G06F 11/1474; H04L 67/06; H04L 67/42
USPC ........................................................ 709/203
See application file for complete search history.

(56) References Cited

U.S. PATENT DOCUMENTS

| | | | |
|---|---|---|---|
| 6,092,087 A | 7/2000 | Mastors | |
| 8,103,643 B2 | 1/2012 | Danilov | |
| 2012/0179645 A1* | 7/2012 | Lomet | G06F 17/30575 707/607 |
| 2014/0019413 A1 | 1/2014 | Braam | |

\* cited by examiner

*Primary Examiner* — Tu Nguyen
(74) *Attorney, Agent, or Firm* — Cesari & Reed, LLP; Kirk A. Cesari; Christian W. Best

(57) ABSTRACT

In distributed state systems, server nodes can receive operation requests from multiple clients. When a server node executes an operation request, the server node can store an indicator of the operation request to a log of operations and send a reply message to the requesting client. The reply message can include a reply log having a list of N executed operation requests. If the server needs rebuilding, any operations not already stored to the server node log may be lost. The server can rebuild lost operations of a file system by receiving the reply logs or indicators of the operations therein from one or more clients.

20 Claims, 7 Drawing Sheets

Log of Operations

| Unique Identifier | Order | Client Identifier | Operation Executed | Time | Client Operation Identification | Object Identifiers | Result Code | Result Payload |
|---|---|---|---|---|---|---|---|---|
| 1 | 12345 | 11 | A0 | 02:14.1458 | 3F | C2 | 11 | D4 |
| 2 | 12346 | 2F | B1 | 09:33.6548 | BB | 05 | 98 | 38 |
| 3 | 12347 | 0C | 3B | 18:35.5865 | A0 | CE | 4F | 70 |
| ••• | ••• | ••• | ••• | ••• | ••• | ••• | ••• | ••• |

FIG. 7

MULTIPLE CONCURRENT IN-FLIGHT REPLIES IN A DISTRIBUTED STATE SYSTEM

SUMMARY

In some embodiments, a system can include a server configured to store a log of operation identifiers for executed file system operations. When a reply is to be sent, the server can append a selected number "N" of entries from the log to the reply, and send the reply including the N entries to a client.

In some embodiments, a method can include storing a log of operation identifiers for executed file system operations. When a reply is to be sent, the method can include appending a selected number "N" of entries from the log to the reply, and sending the reply including the N entries to a client.

In some embodiments, a system can include a server configured to, upon recovery from a failure, request a number "N" of executed file system requested operations corresponding to a first client ("first ordered requests"), a number N of executed file system requested operations corresponding to a second client ("second ordered requests"), and a combined list of file system requested operations, including a first file system requested operations from the first client and a second file system requested operations from the second client. The server can be further configured to determine if the first ordered requests and the second ordered requests correspond to file system requested operations included in the combined list, and determine an order of execution for the first ordered requests, the second ordered requests, and for the file system requested operations that do not correspond to the first ordered requests or the second ordered requests ("unordered requests").

BRIEF DESCRIPTION OF THE DRAWINGS

FIG. 7 is diagram of a log of operations, in accordance with certain embodiments of the present disclosure.

DETAILED DESCRIPTION

In the following detailed description of the embodiments, reference is made to the accompanying drawings which form a part hereof, and in which are shown by way of illustrations. The features of the various embodiments and examples described herein may be combined, exchanged, removed, other embodiments utilized, and structural changes made without departing from the scope of the present disclosure.

Network systems, such as distributed networks, can include servers, clients, and arrays of data storage coupled together via communication networks. The clients can be systems (e.g. operating system) or applications (e.g. email client), and can request access to data in the arrays of data storage. The server can service the client's request using a file system. File systems can have information about a location of the data (e.g. which data storage(s)), which clients have permission to access the data, how the data is accessed, and so forth. In an example, email messages that are read by a personal computer based email client can be downloaded from an email server. To provide the client with the requested messages, the email server may have to verify the credentials of the requesting email client, find the messages in an array of data storage, and then transmit the data to the client.

Examples are provided herein illustrating systems of a distributed state system configured to allow multiple concurrent in-flight replies to simultaneous operation requests while maintaining a consistent, recoverable distributed state.

Figure 1:
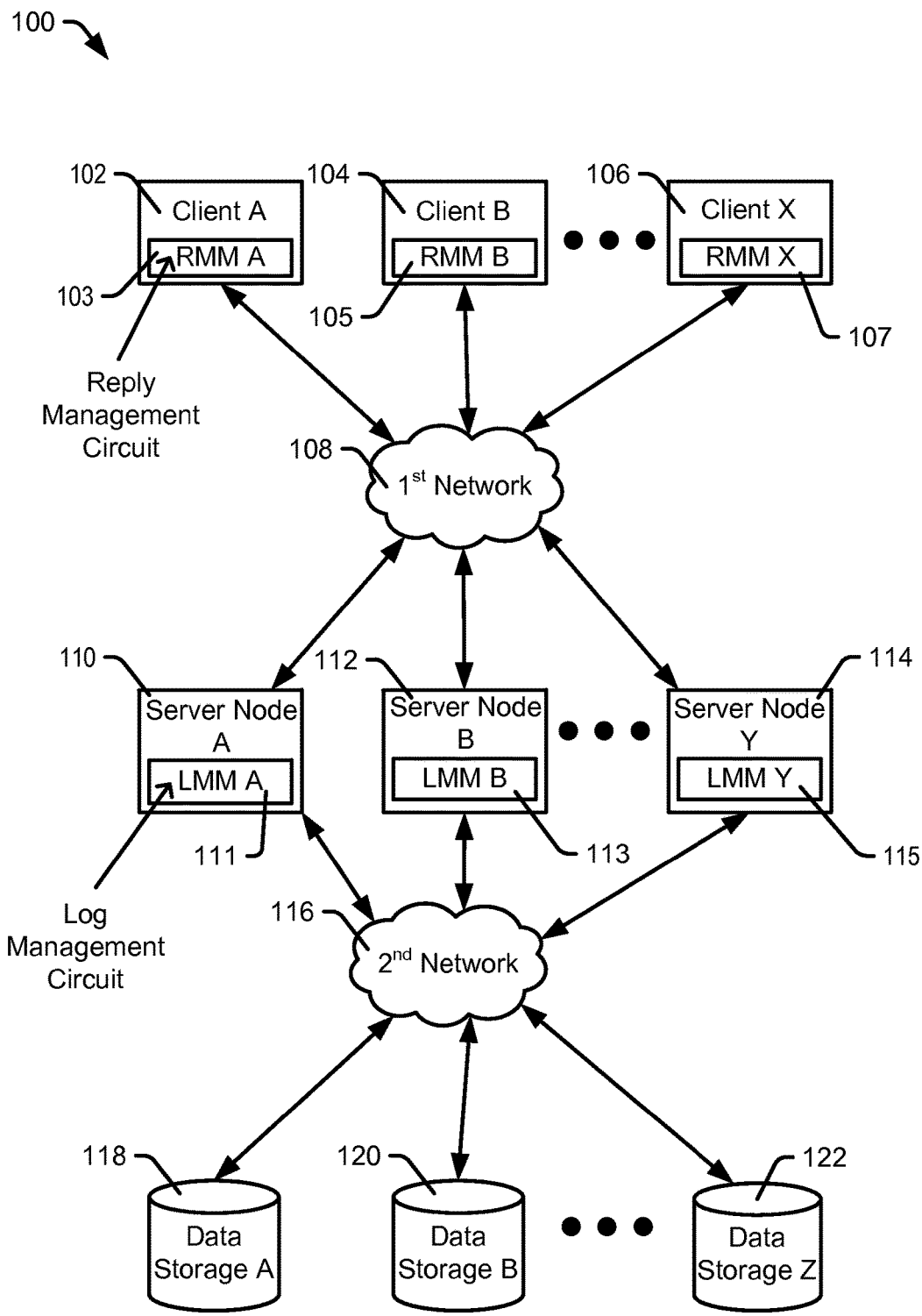
FIG. 1 is a diagram of a system with multiple concurrent in-flight replies in a distributed state system, in accordance with certain embodiments of the present disclosure.

Referring to FIG. 1, certain embodiments of a system of multiple concurrent in-flight replies in a distributed state system are shown and generally designated 100. The distributed state system 100 can allow one or more clients (e.g. 102, 104, 106) to access data in arrays of data storage (e.g. 118, 120, 122) via server nodes (110, 112, 114). In some examples, the clients, the arrays of data storage, and the server nodes may be at different physical locations, and may communicate via one or more networks.

In some cases, a distributed state system may include multiple servers implementing a parallel file system. Parallel files systems can store a copy of a same file system in each server, such as server nodes 110, 112, and 114. Each copy of the parallel file system can allow a corresponding server to access data in the arrays of data storage independent of other servers. This can allow each server to independently respond to client access requests for the data in the arrays of data storage. For example, a client access request may include a read or write operation for specific data from or to the arrays of data storage.

System 100 can include multiple clients, such as client A 102, client B 104, a client X 106, other clients, or any combination thereof. In some embodiments, each of the clients may be computer systems or terminals configured to communicate over a network 108. In some cases, a client may be processes or operations on a server node, desktop, laptop, phone, tablet, or other electronic device or system. For example, a client can be a weather application operating in a portable device that periodically connects to a server node to retrieve temperature data. In some cases, a device can have multiple clients, where multiple processes can be running on a single piece of hardware, and each of the multiple processes may be requesting access to data via one or more of the parallel file systems.

For each data operation request that a client makes, the client can receive a reply message. For example, a reply message may include an acknowledgement indicator or other data informing the client that the server node received or processed the operation request. Each client can have a reply management module ("RMM") that can keep a history of the replies received from each server node. For example, the client A 102 can have an RMM A 103, client B 104 can have an RMM B 105, and client X 106 can have an RMM X 107. The RMMs A 103, B 105, and X 107, may be executed by a processor to perform reply management functions whenever a reply message is received from a server node. The client may store the reply message to a volatile memory, although it may be possible to store the reply message to a persistent memory, if available.

Each server node, such as server node A 110, server node B 112, and server node Y 114, can include a variation of the parallel file system. The server nodes A 110, B 112, and Y 114 can be communicatively coupled to the clients A 102, B 104, and X 106 via a first network 108. The server nodes A 110, B 112, Y 114 can be devices that process operation requests related to the parallel file system, or other request, from the clients A 102, B 104, or X 106. In some cases, the operation requests may be for data retrieval, data storage, data modification, or other operations. In some examples, the server nodes A 110, B 112, or Y 114 may also be clients, because each server node could access another server for a data operation.

Each server node can include a log management module ("LMM"), which can store a history of data operations received from clients. For example, the server node A 110 can include LMM A 111, the server node B 112 can include a LMM B 113, and the server node Y 114 can include LMM Y 115, all of which may store a history of data operations corresponding to each of the respective server nodes. The LMMs A 111, B 113, and Y 115 may be accessed, such as by a program executed by a processor, to perform log management functions, which can include building a log of executed operations and sending a reply message to a requesting client. In some embodiments, the LMAs A 111, B 113, and Y 115 may include a log(s) of operations that have been received but not yet executed. In certain embodiments, the reply message may include a previous N number of executed operation(s), which may be determined based on a log.

Further, the server nodes A 110, B 112, and Y 114 can be communicatively coupled to arrays of data storage A 118, B 120, or Z 122 via a second network 116. The arrays of data storage A 118, B 120, and Z 122 may be one more data storage servers or devices. The data storage servers or devices may include non-volatile solid state memory, hard disc drives ("HDD"), or other types of data storage devices, which may be organized in a redundant array of independent discs ("RAID") or other data storage configurations. The arrays of data storage A 118, B 120, and Z 122 may be located in different physical locations; the arrays of data storage may be part of one or more of the server nodes or may be independent.

The first network 108 and the second network 116 may be a local area network ("LAN"), wireless network, internet, intranet, satellite network, other network, or any combination thereof.

During operation, a client can send a message to a server node requesting an operation related to data accessible to the parallel file system. The message can be directed to a correct server node via a mapping function. The mapping function may be algorithmic or an explicit layout as provided by a known mapping service. In some cases, the requesting client can save a record of the request to a list of previous operation requests. The server node can store the request message in a queue and, when resources are available, execute the request. The server node can store an operation identifier to a log of operation identifiers (log of operations) stored in memory, such that the server node has a stored history of the operations received, executed, or both. The operation identifier can include a time stamp, index number, requested operation, other information, or any combination thereof.

The server node can send a reply message to the requesting client, which can include indicators of a list of operations recently executed by the server node.

When the requesting client receives the reply message, the client can extract the reply log (i.e. the indicators of operations) from the message and store it to a memory. Once the reply message is received, the requesting client can send an acknowledgement message to the server node.

At some later time, if the server node fails, the server node may be rebuilt by requesting reply logs and lists of operation requests previously sent by the clients in the network. Once the rebuilding server receives the reply logs or the list of operation requests, the rebuilding server may organize the operations indicated in such lists. Operations from the reply logs can be executed in an order indicated by order information associated with the operations, which may have been stored in the reply logs. Operations from the lists of operation requests that do not correspond to operations indicated in a reply log may be executed in an order determined by the server node.

Figure 2:
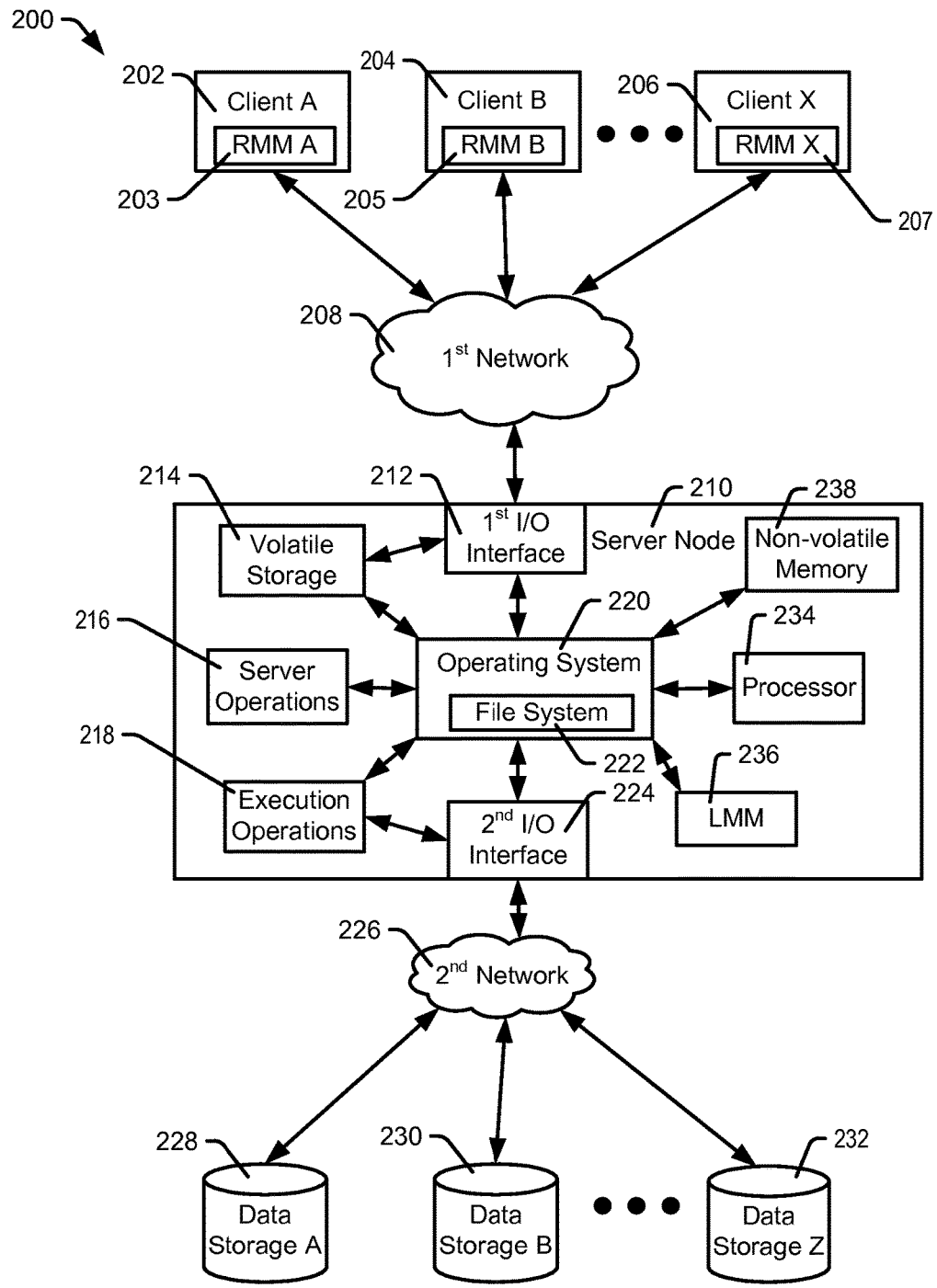
FIG. 2 is a diagram of a system with multiple concurrent in-flight replies in a distributed state system, in accordance with certain embodiments of the present disclosure.

Referring to FIG. 2, certain embodiments of a system with multiple concurrent in-flight replies in a distributed state system are shown and generally designated 200. System 200 is an example of system 100, in accordance with certain embodiments. The system 200 can include client A 202, client B 204, and client X 206. The client A 202 can have RMM A 203, client B 204 can have RMM B 205, and client X 206 can have RMM X 207. The clients A 202, B 204, and X 206 may be coupled to a server node 210 via a first network 208.

The server node 210 can include a first input/output (I/O) interface 212, volatile storage 214, server node operation instruction module 216, client operations execution module 218, operating system 220, file system 222, processor 234, LMM 236, non-volatile memory 238, and second I/O interface 224. The second I/O interface 224 may be coupled to arrays of data storage A 228, B 230, or Z 232 via a second network 226.

The file system 222 may be a distributed state file system, and may be stored in the non-volatile memory 238. The file system 222 can be configured to perform data operations corresponding to data in the arrays of data storage A 228, B 230, or Z 232 based on requests from the clients A 202, B 204, or X 206. In some embodiments, the file system 222 may allow more than one server node to access or modify the same file or parts of the same file. When data is located in multiple arrays of data storage, the file system 222 can include information that allows any of the server nodes implementing the file system 222 to access the data wherever the data is stored in the arrays of data storage.

During operation, when a client sends an operation request, the first I/O interface 212 can receive the file operation request, the processor 234 can store the file operation request to a list of ordered operation requests, such as in the volatile store 214. When resources are available, the file system 222 can direct the processor 234 to process the file operation requests via the execution operations module 218. The operations execution module 218 can perform data operations to retrieve, store, update, modify, create, delete (or any other operation) data in the arrays of data storage A 228, B 230, or Z 232, or any combination thereof The server operations module 216 can manage faults, schedule tasks, manage power, monitor network traffic, or perform other operations.

The LMM 236 may store information pertaining to the executed operation requests in a server node log. The server node log may include client identifiers, executed operations, timestamps, and so forth. The log can include a list of executed operations processed since a last system reboot, file system restore, file system backup, or other times or events. In some cases, log entries for newly executed operation requests may be appended to an existing log of operations. A log entry can include an operation code, operands, transaction number, status, result code, other information, or any combination thereof. The log of operations may be a first-in-first-out log. In some cases, log entries may be purged based on age or order number. The server node log may be periodically stored to the non-volatile memory 238. For example, the server node log may be stored to the non-volatile memory 238 every few seconds.

A remote procedure call ("RPC") request can include an initial request message sent from a client node 202 to a server node 210. At some time later, a reply message from the server node to the requesting client may indicate the requested operation has been executed in server volatile storage 214. The executed operations may have an execution identification value, which may be referred to as a version. At some point still later, executed operations may be persisted to non-volatile memory 238. RPC requests that have been initiated but are not yet persisted to the non-volatile memory 238 are said to be "in-flight." For some in-flight requests, the server may have replied, but the executed operations may not yet be persisted. For some in-flight requests, the server node may not have yet sent a reply to the client.

There may be some number, N, of in-flight RPCs at any time. The number N can be based on an allowable number of concurrent, in-flight RPC requests. For example, when N is 10, then at any point in time, there may be up to 10 in-flight RPC requests. In some embodiments, N may be changed on the fly. For example, N can be based on a network load, or based on a client or class of clients. The LMM 236 may send a list of previous N versions of a requesting client's executed operations to the requesting client in a reply message. This list of versions may be stored by the client in the RMM 203.

The client can receive the reply message from the server node 210, and then send an acknowledgement message back to the server node 210. In some embodiments, the acknowledgement message may be used by the server node 210 as a gating mechanism to let the next batch of replies be sent. For example, the server node 210 may wait until an acknowledgement message indicating the client has received all of the N inflight replies is received before sending the client any more in-flight replies. In some examples, the server node 210 may send information to a client indicating a status of the operation request, even if the operation request has not yet been processed.

From time to time, the server node 210 may experience an event that could disrupt the file system 222. The events may include a sudden loss of power, a failure of the operating system 220, a software virus, and so forth. To restore the file system 222, the server node 210 may be reset, and the server node 210 may revert back to its last saved state. In some cases, the last saved state may be stored in the non-volatile memory 238. In some cases, the last saved state may be found in other storage devices that may or may not be local to the server node 210.

There may be circumstances where the last saved state of the server node 210 does not include changes corresponding to in-flight operation requests. This can happen when queued operation requests in the volatile storage 214 are lost as a result of a server node reboot or other event. Therefore, when a server restarts after a failure, the server node may need to re-execute any previous in-flight operations in order to ensure the previous in-flight operations are persisted to non-volatile storage. To do so, the previous inflight RPCs must be replayed (i.e. re-sent from the client and re-executed on the server).

The server node 210 can rebuild any in-flight RPCs that may have been lost by requesting a list of requested operations and reply logs from the clients A 202, B 204, and X 206. When the server node 210 fails, the clients A 202, B 204, and X 206 may try to reconnect to the server node 210. When the server node 210 restarts, the server node 210 may request the list of requested operations and the reply logs from the clients A 202, B 204, and X 206 as they reconnect to the server node 210. Since the reply logs were sent before the file system 222 failed and stored in the RMM 203, they can contain an ordered record of executed operation requests that the server node 210 had not recorded in the non-volatile memory 238. The server node 210 may combine the reply logs and lists from the clients A 202, B 204, and X 206, and sort the executed operations in original order. The server node 210 may determine the original order based on version numbers of the executed operation requests and requested operations. The server node 210 may replay the requests in the original order, thus correctly rebuilding the file system state that was lost during the failure.

The server node 210 may check the sorted operations against the file system 222 to determine what operation requests are logged but not yet executed. A version of the object (e.g. data) may be stored automatically with any object changes. The version of the object in the non-volatile memory 238 can be compared with the version of the object in the list of requested operations. Any versions of the object in the list of requested operations that are older than a newest version may be discarded (having already been stored and executed). The unexecuted operations indicated in the reply messages can then be executed in a determined order to rebuild the file system 222. For unordered requests (i.e. operation requests for which the client has never received a reply), the versioning may not matter. The file system 222 may not create a dependency on an operation without a version. The operation may be requested, but no subsequent operation may be allowed on the object until the request has completed and a version is assigned. Once the file system 222 is rebuilt, the server node 210 can resume executing new operation requests.

Figure 3:
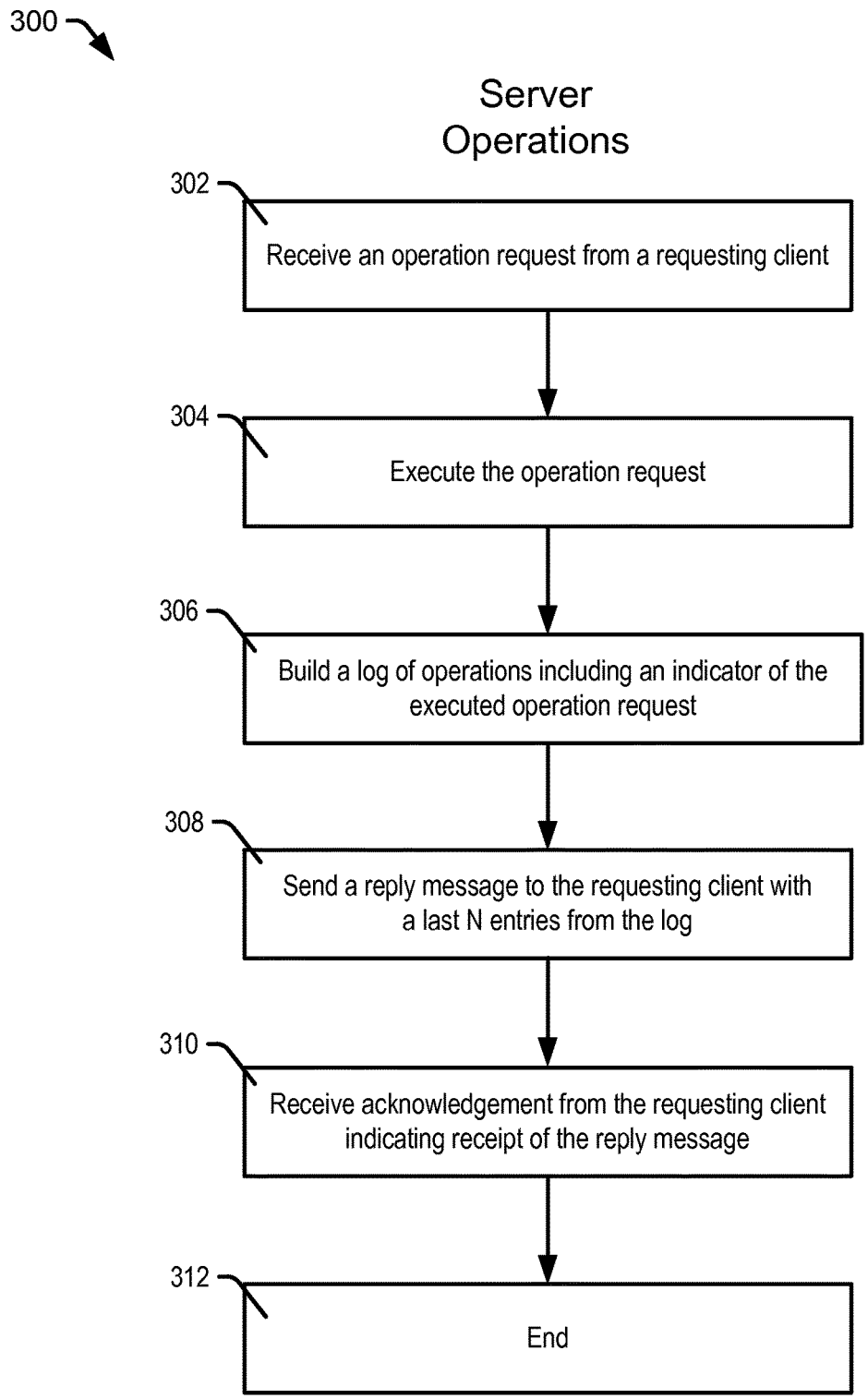
FIG. 3 is a flowchart of a method of server node operations for multiple concurrent in-flight replies in a distributed state system, in accordance with certain embodiments of the present disclosure.

Referring to FIG. 3, a flowchart of a method for multiple concurrent in-flight replies in a distributed state system is shown and generally designated 300. The method 300 may be implemented by systems 100, 200, or other systems, according to certain embodiments. The method 300 can be an example of server node operations.

The method 300 can include receiving a file system operation request from a requesting client, at 302. In some embodiments, the operation request may be stored in a queue. The received operations requests can be executed, at 304. In some cases, the operation requests may be executed in the order in which they were received, although in another examples, the operation requests may be executed based on priority or other factors. For example, operation requests from different clients may have may have different execution priority values.

The method 300 can include building a log of operations, at 306. The log of operations can include versions corresponding to executed file system operations. When a new file system operation is executed, the corresponding version can be added to the log of operations. In some cases, versions older than a current version may be purged. The method 300 can include appending N entries from the log to a reply message, and sending the reply message to the requesting client, at 308. The method 300 can receive an acknowledgement message corresponding to a specific reply message from the requesting client, at 310. The method 300 can end, at 312, or repeat as necessary for additional requests.

Figure 4:
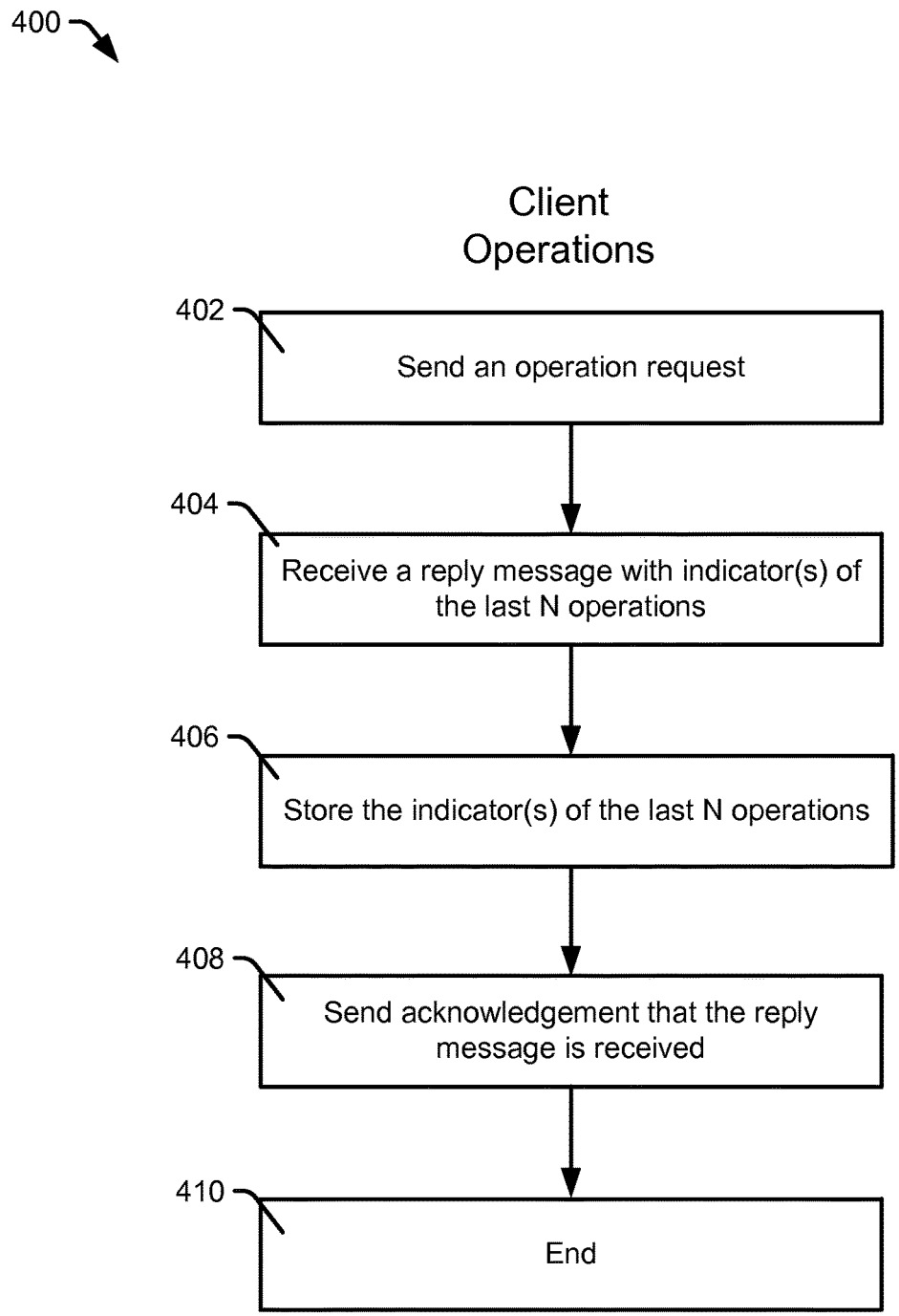
FIG. 4 is a flowchart of a method of client operations for multiple concurrent in-flight replies in a distributed state system, in accordance with certain embodiments of the present disclosure.

Referring to FIG. 4, a flowchart of a method for multiple concurrent in-flight replies in a distributed state system is shown and generally designated 400. The method 400 may be implemented by systems 100, 200, or other systems, according to certain embodiments. The method 400 can be an example of client operations.

The method 400 can include sending an operation request to a server node, at 402. The operation request can include data operations, such as sending data, receiving data, modifying data, modifying metadata, and so forth. Further, the operation request can include object operations, such as modifying, creating, deleting, or renaming.

The method 400 can include receiving a reply message indicating an operation request has been executed at a server node, at 404. The reply message can include a reply log, which can have indicators of N previously executed operation requests. The reply log can be extracted from the reply message and stored to a non-volatile memory, at 406. In some cases, multiple reply logs may be stored. An acknowledgement message indicating the reply log was received may be sent to a server node that sent the reply message, at 408. The method 400 can end, at 410. In some cases, operations 406 and 408 may be reversed in order or done simultaneously.

Figure 5:
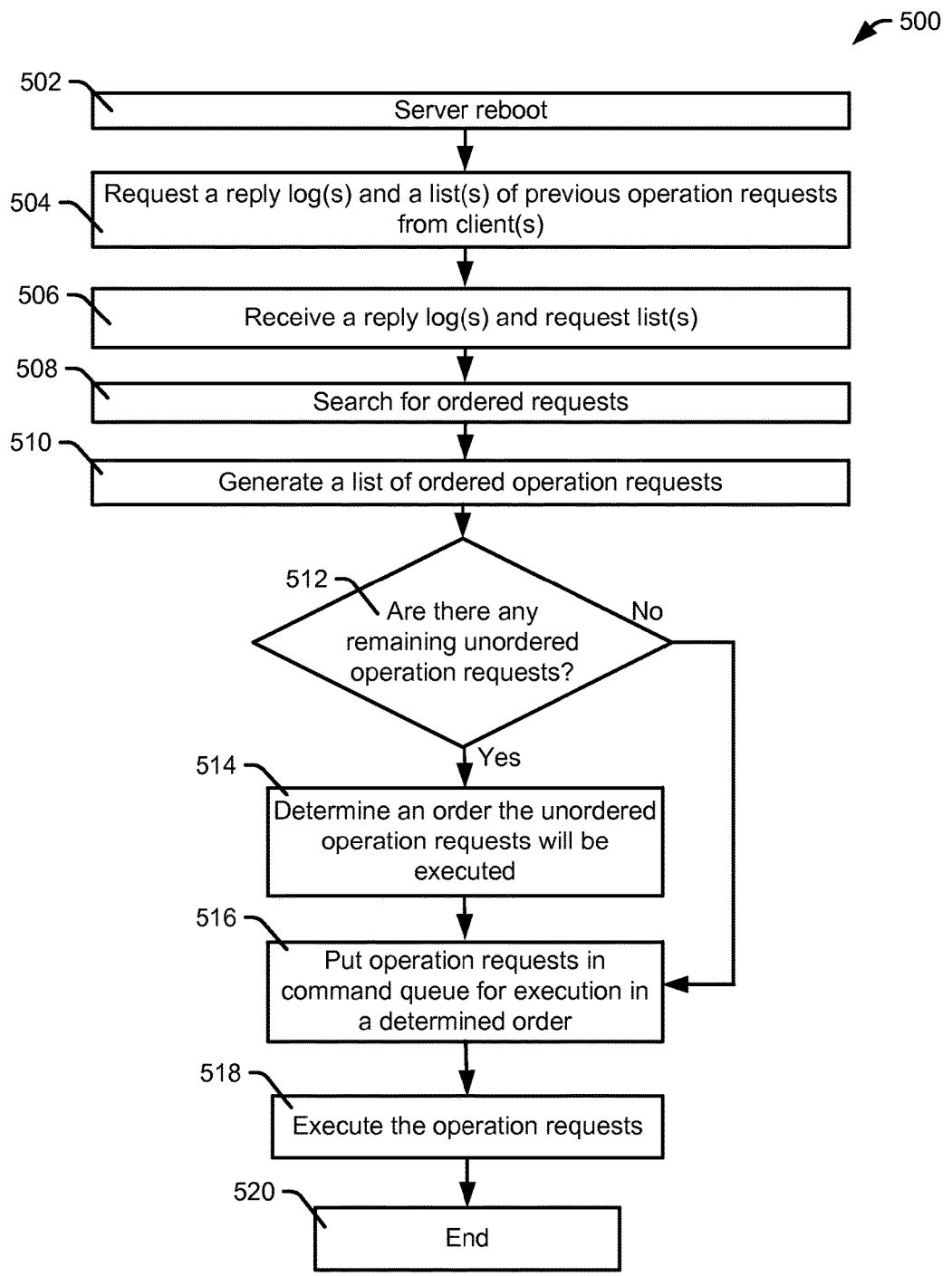
FIG. 5 is a flowchart of a method of recovery operations for multiple concurrent in-flight replies in a distributed state system, in accordance with certain embodiments of the present disclosure.

Referring to FIG. 5, a flowchart of a method for multiple concurrent in-flight replies in a distributed state system is shown and generally designated 500. The method 500 may be implemented by systems 100, 200, or other systems, according to certain embodiments. The method 500 can be an example of recovery operations after a server node failure.

The method 500 can begin when a server node needs rebuilding or is rebooted, at 502. The server node may be rebooted to start a recovery process after an error has been corrected. Upon recovery, the method 500 can further include requesting a reply log and a list of requested operations from one or more clients, at 504. The reply log(s) and list(s) of requested operations may be received, at 506. The reply logs and the lists may include indicators that a server can use to determine which operations were executed, requested, or both. In some cases, additional information, such as arbitrarily assigned inode numbers, may be received. Inode numbers may be unique identifiers associated with data.

The list(s) of requested operations sent by the client to the server node can contain ordered and unordered operation requests. File system operation request identifiers corresponding to the ordered and unordered operation requests that were received in a reply message may be included in reply logs. In some embodiments, a server node can determine if the file system operation request identifiers correspond to the reply logs. The list of requested operations may be filtered to remove those operations that are listed in the reply logs. A server node can potentially order previously unordered operation requests within N subsequent operation requests from an ordered operation request using the following method.

A relationship between ordered and unordered operation requests in a system with multiple concurrent in-flight replies can be represented in the following mathematical expression:

$$(u\{0,N-1\}oo^*)^*u\{0,N-1\} \text{ where}$$

$u\{0,N-1\}$ is a number of unordered operation requests (e.g. $u(0) \ldots u(N-1)$), and N is a number of in-flight operation requests;

o is an ordered operation request included in the same reply log as the $u\{0,N-1\}$ unordered operation requests; and o* is one or more additional ordered message.

The method 500 may include searching the list(s) of operation requests for ordered requests, at 508. Ordered operation requests can be compared against operation requests in a log of operations. Operation requests indicated in the list(s) of operation requests that correspond to entries in the log of operations may be considered executed, and may be discarded.

The method 500 can generate an ordered list of previously ordered operation requests, at 510. Once the previously ordered operation requests have been reordered, the method 500 can include adding previously unordered operation requests to the ordered list.

Unordered operation requests can be determined to be associated with an ordered operation requests, and then ordered based on the association. The number of unordered operation requests that can be associated with an ordered operation request is based on the number of versions sent by an LMM (e.g. LMM 236). For example, if the maximum allowable number of in-flight operation requests is N, then up to N-1 prior unordered operation requests may be associated with an ordered operation. When there are multiple clients, up to N-1 unordered operation requests may be associated with ordered operation for each client.

The association between an ordered operation and any previously unordered operations may be determined by finding a most recent ordered operation request from the list(s) of operation requests, and then finding a previously unordered operation requests related to the selected ordered operation request. In some embodiments, the ordered operation request can include a list of request identifiers and versions resulting from the N-1 prior operations. The versions can be applied to the previous N-1 unordered operation request, which can result in an ordering of the previous N-1 unordered operation requests. Unordered operation requests that are grouped with multiple ordered operation requests can be represented by the following mathematical expression:

$$(u\{0,N-1\}oo^*)$$

On some cases, operation requests that are included in reply logs that do not correspond to ordered operation requests in the list(s) of requested operation requests can be included in the list of ordered operation requests.

In some cases, less than N of the unordered operation requests may be ordered. For example, $u\{0,N-1\}$ may be represented as $u(0), u(1), \ldots, u(K)$, where K<N. A server may determine that up to $u(X-1)$ of the unordered operation requests may be ordered with order X of the ordered requests to produce X ordered requests, where X is less than or equal to N. Therefore, $u(0), \ldots, u(X-1)$ may be ordered. Operation requests $u(X), \ldots, u(N)$ may remain unordered.

Unordered operation requests with an ordered operation request after them may be ordered by the versions described in the ordered operation request. The only remaining operation requests may be those with no ordered operation request after them. These unordered operation requests may be arranged in any order after the ordered operation requests. In some cases, the server node may determine the order of the unordered operation requests. The method 500 can include determining if there any remaining unordered operation requests, at 512. When there are unordered operation requests remaining, the method 500 can include determining in what order the unordered operation requests can be executed, at 514. For example, the unordered operation requests can be assigned an arbitrary order, such as a first-come-first serve from the list of requested operations. In some examples, the unordered operation requests can be appended to the list of ordered operation requests after all of the ordered operation requests. A restoration list can include the unordered and the X ordered operation requests compiled in order of operation. The operation requests in the restoration list may be put into a command queue at 516, and executed, at 518.

In circumstances where all of the operation requests in the list of operation requests can be ordered, the ordered operation requests can be placed in a command queue, at 516, and executed, at 518. The method 500 may end, at 520.

Figure 6:
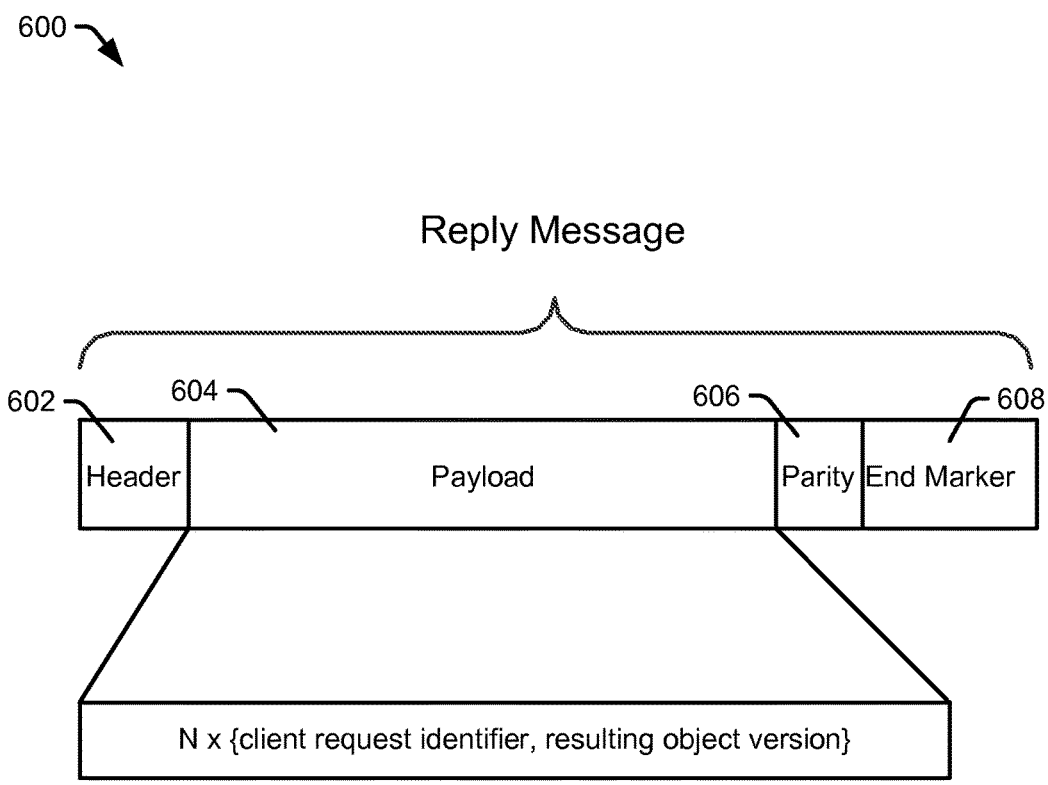
FIG. 6 is a diagram of a reply message, in accordance with certain embodiments of the present disclosure.

Referring to FIG. 6, a diagram of a reply message is shown and generally designated 600. The reply message 600 can be the reply message discussed in FIGS. 1, 3, and 4.

In some embodiments, the reply message 600 may include a header 602. The header 602 may include metadata, client identifier, server node identifier, order marker, other information, or any combination thereof. The reply message may further include a payload 604. In some examples, the header 602 may contain information indicating what the nature of the data in payload 604 is. In some cases, the payload 604 can include data corresponding to a client request identifier, resulting object version, inode numbers, other data, or any combination thereof. For example, a payload can include N pairs of {client request identifier, resulting object version}.

The reply message 600 may further include one or more parity bits 606. Further, the reply message 600 can include an end marker 608 to indicate an end of the reply message 600. In some cases, reply message 600 may include other fields.

Referring to FIG. 7, a diagram of a log of operations is shown and generally designated 700. The log of operation 700 can be the log of operations log discussed in FIGS. 2 and 3. The log of operations 700 can include one or more entries, such as a unique identifier 702, order number 704, or client identifier 706. The entries may further include an operation identifier 708, a time stamp 710, client operation identification 712, object identifiers 714, result code 716, result code 716, payload result 718, or other information. The server node log 700 is but one example of a server node log; other examples may have more or fewer fields, the fields may be in a different order, and so forth.

As used herein, a module may be an instruction, set of instructions, algorithm, function call, firmware, software, or any combination thereof, that can be executed by a processor device to perform a corresponding function. Modules can be stored in a memory, and accessed by a processor device or other hardware as needed. In some examples, a module may be implemented by a hardware circuit, software, or any combination thereof.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A system comprising:
   a server configured to:
   store a log of operation identifiers for executed file system operations;
   when a reply is to be sent, append a selected number of entries from the log to the reply;
   send the reply including the selected number of entries to a client;
   upon recovery from a failure, request the selected number of entries and a list of file system operation request identifiers from the client;
   determine if file system operation request identifiers from the list correspond to the selected number of entries;
   determine an order of execution for file system operation request identifiers that correspond to the selected number of entries and file system operation identifiers that do not correspond to the selected number of entries; and
   execute operations according to the determined order of execution.

2. The system of claim 1 comprising the server further configured to:
   receive a file system operation request from the client; and
   execute the file system operation request.

3. The system of claim 2 comprising the server further configured to:
   append the log with an operation identifier corresponding to the executed file system operation request.

4. The system of claim 3 comprising the server further configured to:
   send the reply to the client; and
   receive an acknowledgement from the client indicating the client has received the reply.

5. The system of claim 1 comprising the server further configured to:
   determine if any of the file system operation identifiers that do not correspond to the selected number of entries remain; and
   determine an order of execution of file system operation requests based on remaining file system operation identifiers that do not correspond to the selected number of entries.

6. The system of claim 5 comprising the server further configured to:
place file system operation requests corresponding to the ordered requests and file system operation requests corresponding to the unordered requests in a command queue in a determined order; and
execute the file system operation requests in the command queue.

7. The system of claim 1 further comprising:
a set of multiple servers including the server, the set of multiple servers implementing a parallel file system;
an array of data storage devices accessible by the set of multiple servers; and
the server is configured to execute the operations including performing data accesses to the array of data storage devices.

8. A method comprising:
storing a log of operation identifiers for executed file system operations;
when a reply is to be sent, appending a selected number of entries from the log to the reply;
sending the reply including the selected number of entries to a client;
upon recovery from a failure, requesting the selected number of entries and a list of file system operation request identifiers from the client;
determining an order of execution of file system operations to produce a group of ordered requests, including:
determining an order of execution of file system operation request identifiers from the list that correspond to the selected number of entries;
determining an order of execution of file system operation request identifiers from the list that do not correspond to the selected number of entries; and
executing operations in an order based on the determined order of execution of file system operations.

9. The method of claim 8 further comprising:
receiving a file system operation request from the client; and
executing the file system operation request.

10. The method of claim 9 further comprising:
appending the log with an operation identifier corresponding to the executed file system operation request.

11. The method of claim 10 further comprising:
sending the reply to the client; and
receiving an acknowledgement from the client indicating the client has received the reply.

12. The method of claim 8 further comprising:
determining if any unordered requests remain; and
determining an order file system operation requests corresponding to the unordered requests will be executed.

13. The method of claim 12 further comprising:
placing file system operation requests corresponding to the ordered requests and file system operation requests corresponding to the unordered requests in a command queue in a determined order.

14. A system comprising:
a server configured to:
upon recovery from a failure, request a number of executed file system operation request identifiers corresponding to a first client ("first ordered requests"), a number of executed file system operation request identifiers corresponding to a second client ("second ordered requests"), and a combined list of file system operation request identifiers, including a first file system operation request identifiers from the first client and a second file system operation request identifiers from the second client;
determine if the first ordered requests and the second ordered requests correspond to file system operation request identifiers included in the combined list; and
determine an order of execution for the first ordered requests, the second ordered requests, and for the file system operation request identifiers that do not correspond to the first ordered requests or the second ordered requests ("unordered requests").

15. The system of claim 14 comprising the server further configured to:
group order numbers 0 through "X−1" of the unordered requests with order number "X" of ordered requests corresponding to the first ordered requests to produce "X" ordered requests wherein X is less than or equal to the number of executed file system operation request identifiers corresponding to a first client.

16. The system of claim 15 comprising the server further configured to:
group order numbers 0 through X−1 of the unordered requests with order number X corresponding to the second ordered requests to produce X ordered requests.

17. The system of claim 16 comprising the server further configured to:
determine if any of the unordered requests remain; and
determine an order file system operation requests corresponding to the unordered requests will be executed.

18. The system of claim 16 comprising the server further configured to:
place file system operation requests corresponding to an order of the ordered requests and file system operation requests corresponding to the ordered requests in a command queue in a determined order; and
execute the file system operation requests in the command queue.

19. The system of claim 14 further comprising:
the server is configured to:
store a log of operation identifiers for executed file system operations of a requesting client, the requesting client is the first client or the second client;
when a reply is to be sent, append multiple entries from the log corresponding to the requesting client to the reply; and
send the reply including the multiple entries to the requesting client.

20. The system of claim 14 further comprising:
the server is configured to execute a parallel file system in which a copy of the parallel file system is stored at each server of a set of multiple servers;
each server of the set of multiple servers is configured to access an array of data storage devices; and
the first client and the second client include computer terminals remote from the server.

* * * * *